(12) United States Patent
Feldhues et al.

(10) Patent No.: US 7,255,737 B2
(45) Date of Patent: Aug. 14, 2007

(54) ORGANIC FORMULATIONS OF PIGMENT

(75) Inventors: Ulrich Feldhues, Bergisch-Gladbach (DE); Frank Linke, Köln (DE); Ronald Göbel, Leverkusen (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

(21) Appl. No.: 11/109,313

(22) Filed: Apr. 19, 2005

(65) Prior Publication Data
US 2005/0241532 A1   Nov. 3, 2005

(30) Foreign Application Priority Data
Apr. 20, 2004   (DE) .................. 10 2004 019 020

(51) Int. Cl.
| | |
|---|---|
| C09B 67/20 | (2006.01) |
| C09B 45/14 | (2006.01) |
| C09B 67/00 | (2006.01) |
| C09B 67/36 | (2006.01) |
| C09D 5/33 | (2006.01) |
| C09D 11/00 | (2006.01) |
| C09D 11/02 | (2006.01) |
| C09D 17/00 | (2006.01) |
| G02B 5/20 | (2006.01) |
| G02B 5/22 | (2006.01) |
| G02F 1/00 | (2006.01) |

(52) U.S. Cl. .................. 106/496; 106/31.77; 106/493; 106/498; 427/162; 427/164; 430/7; 430/32; 430/270.1; 524/86; 524/99; 524/100; 524/403; 349/106

(58) Field of Classification Search ................ 106/493, 106/496, 498, 31.77; 534/703, 403; 427/162, 427/164; 430/7, 32, 106, 270.1; 524/86, 524/99, 100; 349/106
See application file for complete search history.

(56) References Cited

U.S. PATENT DOCUMENTS

| | | | |
|---|---|---|---|
| 3,869,439 A | 3/1975 | Schundehutte | 260/146 D |
| 4,622,391 A | 11/1986 | Lorenz et al. | 534/707 |
| 4,628,082 A | 12/1986 | Lorenz et al. | 534/707 |
| 6,077,339 A | 6/2000 | Nyssen et al. | 106/31.77 |
| 6,211,346 B1 | 4/2001 | Linke et al. | 534/707 |
| 6,261,358 B1 | 7/2001 | Sommer et al. | 106/496 |
| 6,350,307 B1 | 2/2002 | Linke et al. | 106/496 |
| 6,448,385 B2 | 9/2002 | Herrmann et al. | 534/707 |
| 6,596,446 B2 | 7/2003 | Wolf et al. | 430/7 |
| 6,881,830 B2 * | 4/2005 | Feldhues et al. | 534/602 |
| 2001/0047087 A1 * | 11/2001 | Herrmann et al. | 534/15 |
| 2002/0034696 A1 | 3/2002 | Wolf et al. | 430/7 |
| 2002/0111465 A1 | 8/2002 | Linke et al. | 534/703 |
| 2002/0111466 A1 | 8/2002 | Linke et al. | 534/703 |
| 2003/0187108 A1 | 10/2003 | Feldhues et al. | 524/100 |

FOREIGN PATENT DOCUMENTS

| | | |
|---|---|---|
| DE | 195 35 246 | 3/1997 |
| JP | 11-209631 | 8/1999 |
| JP | 11-209632 | 8/1999 |
| JP | 11-217514 | 8/1999 |

OTHER PUBLICATIONS

Rompp Lezikon, Lacke und Druckfarben, Dr. Ulrich Zorll, Thieme Verlan, Stuttgart, New York, 1998, pp. 445-446 and 491-492, no month.

* cited by examiner

*Primary Examiner*—Anthony J. Green
(74) *Attorney, Agent, or Firm*—Michael A. Miller

(57) ABSTRACT

The present invention is directed to pigment formulations comprising at least one metal complex of an azo compound which in the form of its tautomeric structures generally conforms to the formula (I)

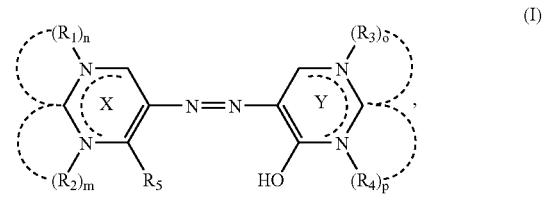

The invention is further directed to processes for their production of the metal complexes and their use and particularly to color filters and the use of the color filters.

37 Claims, No Drawings

ORGANIC FORMULATIONS OF PIGMENT

The invention concerns pigment formulations comprising metal complexes, processes for their production, their use, especially to produce colour filters, and also the colour filters themselves.

Colour filters today are chiefly used in liquid crystal displays, screens, colour resolution instruments and sensors. The flat screens of personal computers are a well-known example. There are various ways to produce colour filters, which differ not only in the way the colours are applied but also in the generation of the colour element patterns from the primary colours red, green and blue as well as black. The colours may be applied for example by colouring a base layer (e.g. gelatin) by means of soluble dyes or pigments ("Dye Method", "Dye Dispersion Method"), screen printing, offset printing or inkjet printing of pigment pastes, formulations or inks, electrodeposition of photoresists based on dyes or pigments and also in particular by the pigment dispersion method, which involves the use of pigments dispersed either in a polyimide resin ("non-photosensitive polyimide method") or in a photoresist ("photosensitive acrylic method"). Associated with the methods mentioned, both the direct generation of the colour element patterns by printing and the indirect, photolithographic generation are important, the latter in relation to the abovementioned pigment dispersion method in particular. The technique of the pigment dispersion method in the form of the "non-photosensitive polyimide method" is disclosed for example in JP-A-11-217514 (1998).

In the pigment dispersion method by the photoresist process, the colouring pigments are present dispersed in a UV-curable photoresist. The photoresist, as well as the pigment, generally consists of binder resin, polymerizable monomer, photoinitiator and optionally a solvent. It is prepared for example by first finely dispersing the pigment in the form of a concentrate solvent and optionally binder resin and adjusted immediately prior to application together with the monomer and the photoinitiator and optionally further components. The pigmented photoresist is uniformly applied to the substrate, for example glass, for example, by spin coating, predried, UV-irradiated by means of a photomask, developed by means of generally inorganic alkaline solution to form the desired colour element patterns, and the coating is cleaned and optionally aftercured. This process is repeated for every colour, i.e. generally 3 times for a trichromat in the colours red, green and blue, for example.

The advantages of using pigments in conjunction with the pigment dispersion method are the improved light, moisture and heat resistance of the colour filters compared to dye-based coating systems. On the other hand, the transparency and colour purity of coatings based on pigments are still unsatisfactory, regardless of the coating method. In particular, the incorporation in the photoresist of various pigments mixed to match the desired colour locus values is accompanied by undesirable brilliancy and transparency losses, so that the LCDs have increased energy requirements as a consequence.

EP-A-947563 describes specific azopyrazolones for use in colour filters.

Individual pigments used in prior art colour filters are disclosed for example in JP-A-11-217514, JP-A-11-209631: specifically Colour Index Pigment Yellow 150 and JP-A-11-209632. However, these are still in need of improvement with regard to the requirements described.

In EP-A-1 146 087 (Le A 34 281, pages 1-2) describes a metallized azo pigment useful as a yellow component of green.

The yellowish green colouring component is preferably composed of CI Pigment Green 36 and a yellow metallized azo pigment. To improve the combinability with other hues, it would be advantageous to have a yellowish green colouring component that is very chromatic and transparent. The yellow pigment has to be very chromatic and transparent for this. At the same time, the yellow pigment should not itself have a greenish tinge, for example for better blending down of Pigment Green 36, which is much too green when used as individual component. A small shift in the hue of the yellow pigment towards red and/or an increase in chroma would result in a dramatic improvement in the usefulness of this yellow pigment as a shading component for Pigment Green 36 for example. Ideally, moreover, addition of the respective three colour filters (red, green, blue) should result in complete absorption of light.

It has now been found that the above-described properties of the green hue are distinctly improved on using the hereinbelow described pigment formulation as a yellow component.

The invention accordingly provides a pigment formulation comprising a) at least one metal complex of an azo compound which in the form of its tautomeric structures conforms to the formula (I)

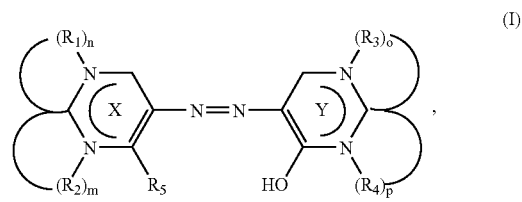

where the

X and Y rings may independently bear one or two substituents selected from the group consisting of =O, =S, =NR$_7$, —NR$_6$H$_7$, —OR$_6$, —SR$_6$, —COOR$_6$, —CN, —CONR$_6$R$_7$, —SO$_2$R$_8$,

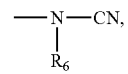

alkyl, cycloalkyl, aryl and aralkyl wherein the sum total of the endo- and exocyclic double bonds is three for each of the rings X and Y, R$_6$ represents hydrogen, alkyl, cycloalkyl, aryl or aralkyl, R$_7$ represents hydrogen, cyano, alkyl, cycloalkyl, aryl, aralkyl or acyl, R$_8$ represents alkyl, cycloalkyl, aryl or aralkyl, R$_1$, R$_2$, R$_3$, R$_4$ independently represent hydrogen, alkyl, cycloalkyl, aryl or aralkyl and, as indicated by the broken lines in the formula (I), may combine to form 5- or 6-membered rings to which further rings may be fused, R$_5$ represents —OH, —NR$_6$R$_7$, alkyl, cycloalkyl, aryl or aralkyl, wherein the R$_1$ to R$_8$ substituents that contain CH bonds may in turn be substituted and m, n, o, p denote 1 or else, in the event that, as indicated by the dotted lines in the formula (I), double bonds emanate from the ring-nitrogen atoms, may also denote zero, and which metal complex intercalates at least one other compound, b) if appropriate an iron compound which is other than component a) and whose iron content is less than 30 ppm, preferably less than 20 ppm and especially less than 10 ppm and more preferably in the range from 1 to 5 ppm, based on component a), and c) at least one metal compound whose metal is in each case other than that of the metal compounds of components a) and b) and whose metal content is at least 10 ppm, based on component a), the metal preferably being selected from the group of alkali metals such as Li, Na and K, alkaline earth metals such as Mg, Ca and Ba, lanthanoids such as La, Ce, Pr and Nd and also Al, Sc, Ti, V, Cr, Mn, Co, Cu, Ni and Zn.

Preferred organic metal complexes of the formula (I) are those of azo compounds which in the form of their free acid conform to one of the tautomeric forms of the formula (I) where, in each of which, the X ring represents a ring of the formulae

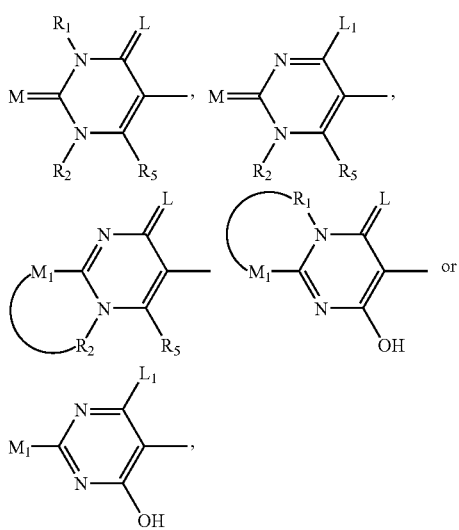

in each of which

L and M independently represent =O, =S or =NR$_6$

L$_1$ represents hydrogen, —OR$_6$, —SR$_6$, —NR$_6$R$_7$, —COOR$_6$, —CONR$_6$R$_7$, —CN, alkyl, cycloalkyl, aryl or aralkyl and M$_1$ represents —OR$_6$, —SR$_6$, —NR$_6$R$_7$, —COOR$_6$, —CONR$_6$R$_7$, —CN, —SO$_2$R$_8$,

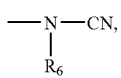

alkyl, cycloalkyl, aryl or aralkyl, wherein the substituents M$_1$ and R$_1$ or M$_1$ and R$_2$ may combine to form a 5- or 6-membered ring.

Particularly preferred organic metal complexes are those of azo compounds which in the form of their free acid conform to one of their tautomeric structures of the formulae (II) or (III)

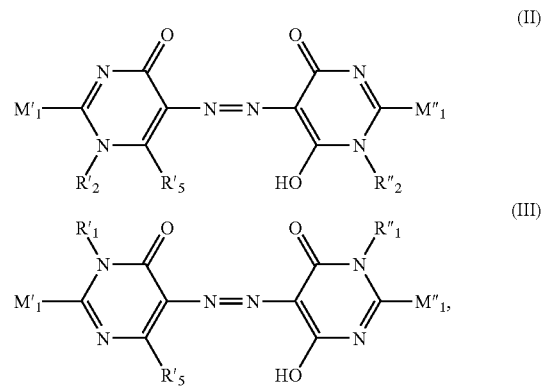

in each of which

R'$_5$ represents —OH or —NH$_2$,

R'$_1$, R"$_1$, R'$_2$ and R"$_2$ each represent hydrogen and

M'$_1$ and M"$_1$ independently represent hydrogen, —OH, —NH$_2$, —NHCN, arylamino or acylamino.

Very particularly preferred metal complexes are those of azo compounds of the formula (I) which in the form of their free acid conform to one of the tautomeric structures of the formula (IV)

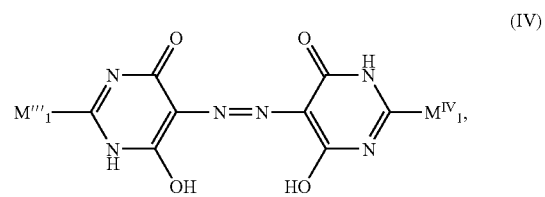

in each of which

M'''$_1$ and M$^{IV}_1$ independently denote OH and NHCN.

Preference is given in particular to organic metal complexes of those azo compounds of the formula (I) which in the form of their free acid conform to one of the tautomeric structures of the formula (V)

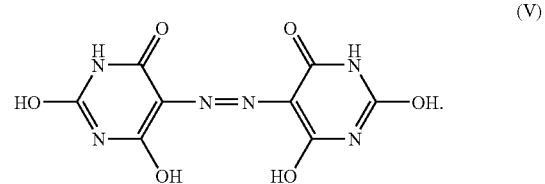

In the foregoing formulae, the substituents preferably have the following meanings:

Alkyl substituents are preferably C$_1$-C$_6$-alkyl, which may be substituted for example by halogen, such as chlorine, bromine or fluorine, —OH, —CN, —NH$_2$ or C$_1$-C$_6$-alkoxy.

Cycloalkyl substituents are preferably C$_3$-C$_7$-cycloalkyl, especially C$_5$-C$_6$-cycloalkyl, which may be substituted for example by C$_1$-C$_6$-alkyl, C$_1$-C$_6$-alkoxy, halogen such as Cl, Br or F, C$_1$-C$_6$-alkoxy, —OH, —CN or NH$_2$.

Aryl substituents are preferably phenyl or naphthyl, which may each be substituted for example by halogen such as F, Cl or Br, —OH, $C_1$-$C_6$-alkyl, $C_1$-$C_6$-alkoxy, —$NH_2$, —$NO_2$ or —CN.

Aralkyl substituents are preferably phenyl- or naphthyl-$C_1$-$C_4$-alkyl, which may be substituted in the aromatic radicals by halogen such as F, Cl or Br, —OH, $C_1$-$C_6$-alkyl, $C_1$-$C_6$-alkoxy, —$NH_2$, —$NO_2$ or —CN, for example.

Acyl substituents are preferably ($C_1$-$C_6$-alkyl)carbonyl, phenylcarbonyl, $C_1$-$C_6$-alkylsulphonyl, phenylsulphonyl, optionally $C_1$-$C_6$-alkyl-, phenyl- or naphthyl-substituted carbamoyl, optionally $C_1$-$C_6$-alkyl-, phenyl- or naphthyl-substituted sulphamoyl or optionally $C_1$-$C_6$-alkyl-, phenyl- or naphthyl-substituted guanyl, where the alkyl radicals mentioned may be substituted for example by halogen such as Cl, Br or F, —OH, —CN, —$NH_2$ or $C_1$-$C_6$-alkoxy and the phenyl and naphthyl radicals mentioned may be substituted for example by halogen such as F, Cl or Br, —OH, $C_1$-$C_6$-alkyl, $C_1$-$C_6$-alkoxy, —$NH_2$, —$NO_2$ or —CN.

If $M_1R_1$ or $M_1R_2$ or $M_1R_2$ and $R_1$, $R_2$, $R_3$, $R_4$, as indicated by the broken lines in the formula (I), form 5- or 6-membered rings, these are preferably triazole, imidazole or benzimidazole, pyrimidine or quinazoline ring systems.

Metal complexes, which is also to be understood as meaning metal salts, of the formulae (I) to (V) preferably include the salts and complexes of the mono-, di-, tri- and tetraanions with the metals Li, Na, K, Mg, Ca, Ba, Al, Sc, Ti, V, Cr, Mn, Co, Ni, Cu, Zn, La, Ce, Pr, Nd, more preferably Na, K, Ca, Ba, Al, Mn, Co, Ni, Cu, Zn, La, Ce, more preferably Ni.

The compounds of the formula (I) are particularly preferably 1:1 azo-metal complexes. Very particular preference is given to the azobarbituric acid-nickel 1:1 complex of the formula (VI) or one of the complex's tautomeric forms

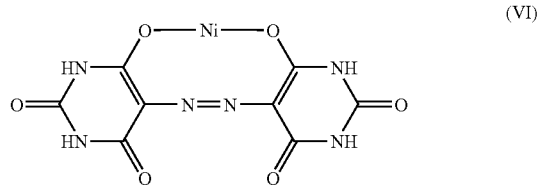

which includes at least one other compound.

Included compounds may be organic compounds and inorganic compounds.

Compounds which can be included come from a very wide variety of classes of compounds. For purely practical reasons, preference is given to such compounds as are liquid or solid under normal conditions (25° C., 1 bar).

Of the liquid substances, preference is given in turn to those which have a boiling point (1 bar) of 100° C. or higher, preferably of 150° C. and higher. Suitable compounds are preferably acyclic and cyclic organic compounds, for example aliphatic and aromatic hydrocarbons, which may be substituted, for example by OH, COOH, $NH_2$, substituted $NH_2$, $CONH_2$, substituted $CONH_2$, $SO_2NH_2$, substituted $SO_2NH_2$, $SO_3H$, halogen, $NO_2$, CN, —$SO_2$-alkyl, —$SO_2$-aryl, —O-alkyl, —O-aryl, —O-acyl.

Carboxamides and sulphonamides are a preferred group of compounds to be included, also suitable in particular are urea and substituted ureas such as phenylurea, dodecylurea and others; and also their polycondensates with aldehydes, especially formaldehyde; heterocycles such as barbituric acid, benzimidazolone, 5-benzimidazolonesulphonic acid, 2,3-dihydroxyquinoxaline, 2,3-dihydroxyquinoxaline-6-sulphonic acid, carbazole, carbazole-3,6-disulphonic acid, 2-hydroxy-quinoline, 2,4-dihydroxyquinoline, caprolactam, melamine, 6-phenyl-1,3,5-triazine-2,4-diamine, 6-methyl-1,3,5-triazine-2,4-diamine, cyanuric acid.

Also suitable for intercalation are polymers, preferably water-soluble polymers, for example ethylene-propylene oxide block polymers, preferably those having an $M_n$ not less than 1000 g/mol, especially from 1000 to 10,000 g/mol, polyvinyl alcohol, poly(meth)-acrylic acids, modified cellulose, such as carboxymethylcelluloses, hydroxyethyl- and -propylcelluloses, methyl- and ethyl-hydroxyethylcelluloses.

Particular preference for use as intercalation compounds is given to melamine or melamine derivatives, especially those of the formula (VII)

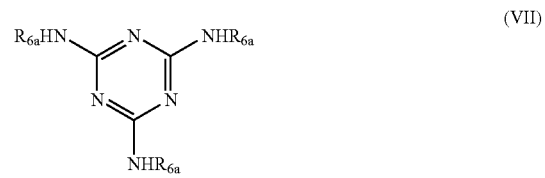

where $R_{6a}$ is hydrogen or $C_1$-$C_4$-alkyl, which is optionally substituted by OH groups, very particularly preferably where $R_{6a}$ is hydrogen.

The amount of substance which can be intercalated in the crystal lattice of the metal compounds is generally 5% to 200% by weight, and especially 5 to 120%, based on the amount of host compound. Preference is given to a guest compound amount of 10 to 100% by weight. The amount referred to here is the amount of substance which is not washed out by suitable solvents and which is obtained from the elemental analysis. Naturally, it is also possible to add more or less than the aforementioned amount of substance, and it may be optionally dispensed with to wash an excess out. Preference is given to amounts of 10 to 150% by weight.

The component a) pigment present in the formulation of the invention has a surface area ($m^2$/g) which is preferably in the range from 70 to 150 $m^2$/g, especially in the range from 85 to 140 $m^2$/g, and most preferably in the range from 100 to 130 $m^2$/g. Surface area is determined according to German standard specification DIN 66131: Determination of specific surface area of solids by gas adsorption after Brunauer, Emmett and Teller (B.E.T.)

The metal of the metal compound of component c) is preferably Li, Na, K, Ca, Ba, Al, Mn, Co, Ni, Cu, Zn, La, Ce, especially Na, K, Co, Cu, particular preference being given to Co and Cu.

The metal compound of component c) can be present for example as an inorganic or organic salt or preferably as an organic metal complex. In the latter case, the metal compound of component c) is preferably present as a metal complex of an azo compound of the formula (I). In this case, the azo compound in question is more preferably the same azo compound as that of component a).

Such a metal complex preferably intercalates at least one other compound, and more particularly this intercalated compound is the same as that of component a).

The formulation comprises preferably from 10 to 10000 ppm, more preferably from 50 to 5000 ppm, even more preferably from 200 to 2500 ppm and most preferably 200-1000 ppm of a metal other than the metal of the metal complex of component a), based on component a).

It is particularly surprising that the pigment formulations of the invention, which include small amounts preferably of the metal of component c) (from 10 to 10000 ppm, preferably from 50 to 5000 ppm, more preferably from 200 to 2500 ppm, most preferably 200-1000 ppm based on component a)) other than the metal of the metal compound of components a) and b), should have a distinctly improved brilliance and/or else a distinctly improved hue. The fact that mixing various colourants generally results in a duller hue would have led one ordinarily skilled in the art to expect that brilliance and hue would not improve but, for example, deteriorate linearly; that is, one of ordinary skill in the art would have expected for example duller and duller, greener hues as a function of the amount of metal of component c).

The metal of the metal compound of component c) is preferably determinable using atomic absorption spectroscopy.

The formulations of the invention are preferably solid at room temperature. They may include further additives as well as components a), c) and if appropriate b).

The iron compound of component b) can be present for example as an organic or inorganic salt or else as a metal complex. In the latter case, the iron compound of component b) is for example present as a metal complex of an azo compound of the formula (I), for example as an Fe complex as the same azo compound as that of component a).

Examples of further additives are dispersants, carboxylic and sulphonic amides and also customary pigment-formulation additives.

Dispersants as used herein are substances which stabilize the pigment particles in their fine particulate form in aqueous media. Finely particulate is preferably understood as meaning a fine division of 0.001 to 5 µm, especially of 0.005 to 1 µm and more preferably of 0.005 to 0.5 µm. The formulation of the invention is preferably present in finely particulate form.

Suitable dispersants are for example anionic, cationic, amphoteric or nonionic.

The dispersant is preferably used in an amount of 0.1 to 100% by weight and especially 0.5 to 60% by weight, based on the use level of pigment of component a) in the pigment formulation.

The formulation may include further additives, of course. For instance, additives which reduce the viscosity of an aqueous suspension and increase the solids content, such as carboxylic and sulphonic amides can be added in an amount of up to 10% by weight, based on the formulation.

But it is particularly preferable for the formulation of the invention to include more than 90%, especially more than 95% and preferably more than 97% by weight of components a) to c) and dispersant.

The invention further provides a process for producing the formulation of the invention, which process is characterized in that a metal complex of an azo compound of the formula (I), said metal complex intercalating a further compound (component a)) is mixed if appropriate with an Fe compound (component b)) whose Fe content is less than 30 ppm, based on component a), and with at least one metal compound whose metal content is less than 10 ppm, based on component a), and whose metal is other than the metal of the metal complex of components a) and b), and if appropriate further additives.

The invention further provides a process for producing the pigment formulation of the invention, wherein the azo compounds of the formula (I) are complexed with a metal salt a) (for component a)) if appropriate in the presence of an Fe compound and in the presence of a metal salt c) (for component c)) which is other than either and the resulting metal complexes are reacted with the compound to be intercalated, characterized in that the level of metal of the metal salt c), based on the sum total of metal complex and intercalated compound, is at least 10 ppm and the iron content is less than 30 ppm, based on component a).

A preferred process is characterized in that the azo compound of the formula (I), preferably as an alkali metal salt such as a sodium, lithium or potassium salt, is reacted with a metal salt a) of metals selected from the group consisting of Li, Na, K, Mg, Ca, Ba, Al, Sc, Ti, V, Cr, Mn, Co, Ni, Cu, Zn, La, Ce, Pr, Nd, more preferably Na, K, Ca, Ba, Al, Mn, Co, Ni, Cu, Zn, La, Ce, especially Ni, in the presence of a different metal salt c) from the same group, preferably at pH<7, and the resulting metal complex is reacted with the compound to be intercalated, the reaction preferably being carried out at a pH of 1 to 7. A preferred embodiment of the process according to the invention is characterized in that, following the intercalation, the pH is raised to not less than 4.5, preferably to 4.5-7, if the intercalation itself is carried out at a pH of less than 4.5.

The iron source can either be an iron salt, which is either present as an impurity in the other metal salts; was especially added; or has come to be in the system through equipment attrition for example.

A further preferred process is characterized in that the azo compound of the formula (I) is introduced as an initial charge, preferably as an alkali metal salt such as a sodium, lithium or potassium salt, in that the compound to be intercalated is added and thereafter reacted with a metal salt a) of metals selected from the group consisting of Li, Na, K, Mg, Ca, Ba, Al, Sc, Ti, V, Cr, Mn, Co, Ni, Cu, Zn, La, Ce, Pr, Nd, more preferably Na, K, Ca, Ba, Al, Mn, Co, Ni, Cu, Zn, La, Ce, especially Ni, in the presence of a different metal salt from the same group, the reaction preferably being carried out at pH<7.

A further preferred process is characterized in that the azo compound of the formula (I) is introduced as an initial charge, preferably as an alkali metal salt such as a sodium, lithium or potassium salt, in that the compound to be intercalated is added and thereafter reacted with a metal salt a) of metals selected from the group consisting of Li, Na, K, Mg, Ca, Ba, Al, Sc, Ti, V, Cr, Mn, Co, Ni, Cu, Zn, La, Ce, Pr, Nd, more preferably Na, K, Ca, Ba, Al, Mn, Co, Ni, Cu, Zn, La, Ce, especially Ni, the reaction preferably being carried out at pH<7. Thereafter, a different metal salt c) of the same group is added and reacted at preferably pH<7. This process is particularly advantageous when the metal of component c) forms stronger complexes with the azo compound of the formula (I) than the metal of component a) does.

A further preferred process is characterized in that the azo compound of the formula (I) is introduced as an initial charge, preferably as an alkali metal salt such as a sodium, lithium or potassium salt, in that the compound to be intercalated is added and thereafter reacted with a metal salt a) of metals selected from the group consisting of Li, Na, K, Mg, Ca, Ba, Al, Sc, Ti, V, Cr, Mn, Co, Ni, Cu, Zn, La, Ce, Pr, Nd, more preferably Na, K, Ca, Ba, Al, Mn, Co, Ni, Cu, Zn, La, Ce, especially Ni, wherein the metal salt is used in a small deficiency 90 to 99% of the molar amount. This process is particularly advantageous when, for example, the reaction preferably being carried out at pH<7, wherein the metal salt is used in a small deficiency (90 to 99% of the molar amount). This process is particularly advantageous when, for example, the employed alkali metal salt of the azo compound of the formula (I) is to act as a dopant.

A further preferred process is characterized in that the azo compound of the formula (I) is introduced as an initial charge, preferably as an alkali metal salt such as a sodium, lithium or potassium salt, in that the compound to be intercalated is added and thereafter reacted with a metal salt a) of metals selected from the group consisting of Li, Na, K, Mg, Ca, Ba, Al, Sc, Ti, V, Cr, Mn, Co, Ni, Cu, Zn, La, Ce, Pr, Nd, more preferably Na, K, Ca, Ba, Al, Mn, Co, Ni, Cu, Zn, La, Ce, especially Ni, in the presence of a component c) metal salt other than that and other than iron, the reaction preferably being carried out at pH<7, wherein the component a) metal salt is preferably used in a small deficiency (for example 99% of the molar amount). This process is particularly advantageous when the metal of component c) forms weaker complexes with the azo compound of the formula (I) than the metal of component a) does.

The optional iron content can be added to the system for example through deliberate addition of metal salt or impurities, or results solely in the use of Fe-containing reactors.

Preferred metal salts are water-soluble metal salts of the abovementioned metals, especially chlorides, bromides, acetates, nitrates, sulphates, etc. Preferred metal salts have a solubility of more than 20 g/l and especially more than 50 g/l in water at 20° C.

Suitable metal salts for preparing the salts and complexes of the azo compounds of component a) and preferably also of component c) are for example: magnesium chloride, magnesium sulphate, calcium chloride, calcium acetate, calcium formate, barium chloride, barium nitrate, barium acetate, barium carbonate, strontium nitrate, manganese chloride, manganese sulphate, cobalt chloride, cobalt nitrate, cobalt sulphate, nickel formate, nickel nitrate, nickel sulphate, nickel chloride, nickel acetate, aluminum sulphate, aluminum nitrate, chromium(III) sulphate, chromium(III) nitrate, zinc chloride, zinc sulphate, zinc acetate, cadmium chloride, cadmium sulphate, cadmium nitrate, copper(II) sulphate, copper(II) chloride, copper(II) acetate, copper(II) formate, lanthanum chloride, lanthanum nitrate, cerium chloride and cerium nitrate.

The resulting mixtures of metal compounds of components a), c) and if appropriate b), hereinafter referred to as "pigments" for short, can then be isolated by filtration of the aqueous suspension as an aqueous presscake. This presscake can be dried by customary drying processes after it has been washed with hot water for example.

Useful drying processes include for example paddle drying or spray drying of appropriately aqueous slurries.

The pigment can subsequently be afterground.

If the pigments are too harshly textured or dispersion harsh for the desired application, they can be transformed into soft-textured pigments, for example by the method described in DE-A 19 847 586.

Preference is accordingly further given to the invention's pigment formulation comprising at least one dispersant as well as components a), c) and if appropriate b).

The pigment formulations are preferably solid formulations, which are preferably present in the form of powders or granules.

The pigments of the invention are notable for particularly good dispersibility and a high colour strength. Chroma and transparency are outstandingly adjustable.

The pigment formulations of the invention are very useful for pigment applications.

They are useful for example for pigmenting varnishes of all kinds for the production of printing colours, distemper colours or binder colours, for the mass colouration of synthetic, semisynthetic or natural macromolecular materials, such as polyvinyl chloride, polystyrene, polyamide, polyethylene or polypropylene for example. They can also be used for the spin-dyeing of natural, regenerated or artificial fibres, such as cellulose, polyester, polycarbonate, polyacrylonitrile or polyamide fibres for example, and also for printing textiles and paper. These pigments provide finely divided, stable, aqueous pigmentations of emulsion and paint colours which are useful for paper colouration, for the pigment printing of textiles, for laminate printing and also for the spin-dyeing of viscose, by grinding or kneading in the presence of nonionic, anionic or cationic surfactants.

The pigments are very useful for ink jet applications and for colour filters for liquid crystal displays.

Particular preference is given to those pigment formulations according to the invention which comprise the components a), c) and if appropriate b) and d) comprising at least one organic compound selected from the group of terpenes, terpenoids, fatty acid esters and the group of homo- or copolymers, such as random or block copolymers, having a solubility of less than 1 g/l and especially less than 0.1 g/l in water at 20° C. and neutral pH.

It is particularly preferable for these pigment formulations according to the invention to be in solid form, preferably in the form of powder or granules.

The organic compound of component (d) is preferably solid or liquid at room temperature (20° C.) under standard pressure and, if liquid, has the boiling point of preferably >100° C. and especially >150° C.

Preferred polymers possess both a hydrophilic and a hydrophobic, preferably polymeric moiety. Examples of such polymers are random copolymers based on fatty acids or long-chain $C_{12}$-$C_{22}$-hydrocarbons and polyalkylene glycols, especially polyethylene glycol. Also block copolymers based on (poly)hydroxy fatty acids and polyalkylene glycol, especially polyethylene glycol, and also graft copolymers based on poly(meth)acrylate and polyalkylene glycol and especially polyethylene glycol.

As preferred compounds from the group of terpenes, terpenoids, fatty acids and fatty acid esters there may be mentioned: ocimene, myrcene, geraniol, nerol, linalool, citronellol, geranial, citronellal, neral, limonene, menthol, for example (−)-menthol, menthone or bicyclic monoterpenes, saturated and unsaturated fatty acids having 6 to 22 carbon atoms, such as for example oleic acid, linoleic acid and linolenic acid or mixtures thereof.

Useful organic compounds for component (d) further include those mentioned above in connection with the abovementioned inclusion compounds, provided they satisfy the criteria desired for the compound of component (d).

When the compound to be intercalated and the compound of component d) are identical, a differentiation is made via the ease with which compound d) can be washed out with a suitable solvent.

Particularly preferred pigment formulations comprise:

50-99% by weight of components a), c) and if appropriate b) and 1-50 Gew.-% and preferably 2% to 50% by weight of at least one compound of component (d).

If appropriate, the pigment formulation of the invention further comprises a surfactant e).

Suitable surfactants (e) are for example anionic, cationic, amphoteric or nonionic in nature.

Suitable anionic surfactants are in particular condensation products of aromatic sulphonic acids with formaldehyde, such as condensation products of formaldehyde and alkyl-naphthalenesulphonic acids or of formaldehyde, naphthalenesulphonic acids and/or benzenesulphonic acids, condensation products of optionally substituted phenol with formaldehyde and sodium bisulphite. Also suitable are surfactants from the group of the sulphosuccinic esters and alkylbenzenesulphonates. Also ionically modified, especially sulphated, carboxylated alkoxylated fatty acid alcohols or salts thereof. Alkoxylated fatty acid alcohols are to be understood as meaning in particular those $C_6$-$C_{22}$ fatty acid alcohols which are provided with 5 to 120, preferably 5 to 60, especially with 5 to 30, ethylene oxide and are saturated or unsaturated. Also suitable in particular are ligninsulphonates, for example those which are obtained by the sulphite or kraft process. Preferably they are products which are partially hydrolysed, oxidized, propoxylated, sulphonated, sulphomethylated or desulphonated and fractionated according to known processes, for example according to the molecular weight or according to the degree of sulphonation. Mixtures of sulphite and kraft ligninsulphonates are likewise very effective. Of particular suitability are ligninsulphonates having an average molecular weight between 1000 and 100000 g/mol, an active ligninsulphonate content of not less than 80% by weight and preferably a low level of polyvalent cations. The degree of sulphonation can vary widely.

Examples of useful non-ionic surfactants are reaction products of alkylene oxides with alkylatable compounds, for example fatty alcohols, fatty amines, fatty acids, phenols, alkylphenols, arylalkylphenols, such as styrene-phenol condensates, carboxamides and resin acids. They are for example ethylene oxide adducts from the class of the reaction products of ethylene oxide with:

a1) saturated and/or unsaturated fatty alcohols of 6 to 22 carbon atoms or b1) alkylphenols having 4 to 12 carbon atoms in the alkyl radical or c1) saturated and/or unsaturated fatty amines of 14 to 20 carbon atoms or d1) saturated and/or unsaturated fatty acids of 14 to 20 carbon atoms or e1) hydrogenated and/or unhydrogenated resin acids.

Suitable ethylene oxide adducts are in particular the alkylatable compounds mentioned under a1) to e1) when combined with 5 to 120, especially 5 to 100, especially 5 to 60, particularly preferably 5 to 30, mol of ethylene oxide.

Suitable surfactants also include the esters of the alkoxylation product of the formula (X) known from DE-A 19 712 486 or from DE-A 19 535 246, which conform to the formula (XI) and also these optionally mixed together with the parent compounds of the formula (X). The alkoxylation product of a styrene-phenol condensate of the formula (X) is as hereinbelow defined:

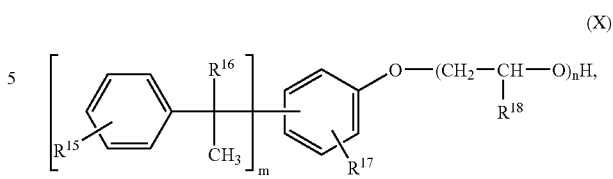

where $R^{15}$ is hydrogen or $C_1$-$C_4$-alkyl, $R^{16}$ is hydrogen or $CH_3$, $R^{17}$ is hydrogen, $C_1$-$C_4$-alkyl, $C_1$-$C_4$-alkoxy, $C_1$-$C_4$-alkoxycarbonyl or phenyl, m is from 1 to 4, n is from 6 to 120, $R^{18}$ is identical or different for each unit with the index n and represents hydrogen, $CH_3$ or phenyl subject to the proviso that, in the case of $CH_3$ being present in the various —($-CH_2$—$CH(R^{18})$—O—) groups, $R^{18}$ is $CH_3$ in 0 to 60% of the total value of n and is hydrogen in 100 to 40% of the total value of n and in the case of phenyl being present in the various —($-CH_2$—$CH(R^{18})$—O—) groups, $R^{18}$ is phenyl in 0 to 40% of the total value of n and is hydrogen in 100 to 60% of the total value of n.

Esters of alkoxylation products (X) conform to the formula (XI)

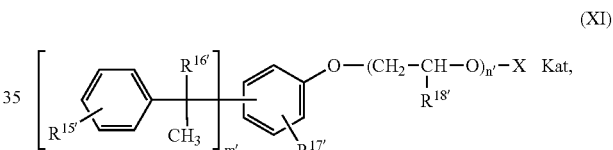

where $R^{15'}$, $R^{16'}$, $R^{17'}$, $R^{18'}$, m' and n' assume the scope of meaning of $R^{15}$, $R^{16}$, $R^{17}$, $R^{18}$, m and n, respectively, but independently thereof, X is —$SO_3$, —$SO_2$, —$PO_3$ or —CO—($R^{19}$)—COO, Kat is a cation selected from the group consisting of H, Li, Na, K, $NH_4$ and HO—$CH_2CH_2$—$NH_3$, subject to the proviso that in the case of X=—$PO_3$ two cations are present, and $R^{19}$ is a divalent aliphatic or aromatic radical, preferably $C_1$-$C_4$-alkylene, especially ethylene, monounsaturated $C_2$-$C_4$ radicals, especially acetylene, or optionally substituted phenylene, especially orthophenylene, preferred substituents being $C_1$-$C_4$-alkyl, $C_1$-$C_4$-alkoxy, $C_1$-$C_4$-alkoxycarbonyl or phenyl.

A preferred surfactant is the compound of the formula (XI). Preferably a compound of the formula (XI) where X is a radical of the formula —CO—($R^{19}$)—COO— and $R^{19}$ is as defined above.

Preference for use as surfactant is likewise given to a compound of the formula (XI) used together with a compound of the formula (X). In this case, the surfactant preferably contains 5 to 99% by weight of the compound (XI) and 1 to 95% by weight of the compound (X).

The surfactant of component c) is preferably used in an amount of 0.1 to 100% by weight, especially 0.5 to 60% by weight, based on the pigment of component a).

The formulation of the invention may contain further additives, of course. For instance, additives which reduce the viscosity or increase the solids content can be added in an amount of up to 10% by weight during the formulation of aqueous suspensions, based on the formulation.

Examples of further additives are inorganic and organic bases and also additives customary for pigment formulation.

Suitable bases are alkali metal hydroxides, for example NaOH or KOH, organic amines such as alkylamines, especially alkanolamines or alkylalkanolamines.

Particular preference is given to methylamine, dimethylamine, trimethylamine, ethanolamine, n-propanolamine, n-butanolamine, diethanolamine, triethanolamine, methylethanolamine or dimethylethanolamine.

Examples of suitable carboxamides and sulphonamides are urea and substituted ureas such as phenylurea, dodecylurea and others; heterocycles such as barbituric acid, benzimidazolone, benzimidazolone-5-sulphonic acid, 2,3-dihydroxyquinoxaline, 2,3-dihydroxyquinoxaline-6-sulphonic acid, carbazole, carbazole-3,6-disulphonic acid, 2-hydroxyquinoline, 2,4-dihydroxyquinoline, caprolactam, melamine, 6-phenyl-1,3,5-triazine-2,4-diamine, 6-methyl-1,3,5-triazine-2,4-diamine, cyanuric acid.

The base is optionally present in up to an amount of 20% by weight, preferably up to 10% by weight, based on the pigment of component a).

The pigment formulations may also contain inorganic and/or organic salts from the production process.

It is particularly preferable for the formulations of the invention to contain more than 90% especially more than 95% and preferably more than 97% of components a), c) and if appropriate b), organic compound of component d) and if appropriate surfactant of component e) and if appropriate a base.

The present invention's use of the above-described pigments or that of the present invention's pigment formulations for producing colour filters for liquid crystal displays will now be described using the pigment dispersion method of the photoresist process as an example.

The present invention's use of the present invention's pigment formulations for producing colour filters is characterized for example in that the "pigment" or the pigment formulation, especially the solid pigment formulation, if appropriate with a binder resin and an organic solvent, if appropriate with added dispersant, is homogenized and subsequently wet-comminuted continuously or batchwise to a particle size by number (electron-microscopic determination) of 99.5%<1000 nm, preferably 95%<500 nm and especially 90%<200 nm.

Useful wet-comminuting methods include, for example stirrer or dissolver dispersion, grinding by means of stirred ball or bead mills, kneaders, roll mill, high pressure homogenization or ultrasonic dispersion.

During the dispersing treatment or thereafter, one or more photocurable monomers and one or more photoinitiators are added. Following dispersion, further binder resin, solvent or customary photoresist additives may be introduced as is required for the desired photosensitive coating formulation (photoresist) for colour filter production. For the purposes of this invention, a photorersist is a formulation containing at least a photocurable monomer and a photoinitiator.

Useful dispersants include generally commercially available for example polymeric, ionic or nonionic dispersants based for example on polycarboxylic acids or polysulphonic acids and also polyethylene oxide-polypropylene oxide block copolymers. It is also possible to use derivatives of organic dyes as dispersants or codispersants.

The production of colour filters therefore gives rise to formulations and contain based on the formulation:
at least one pigment in the above sense, i.e. mixture of components a), c) and if appropriate b),
if appropriate a binder resin,
at least one organic solvent and also
if appropriate a dispersant.

In a preferred embodiment, the formulation contains (percentages based on formulation):
1-50% by weight of a pigment in the above sense
0-20% by weight of binder resin
0-20% by weight of dispersant
10-94% by weight of organic solvent The coating of the photoresist onto a plate to produce the desired picture element pattern can be effected either by direct or by indirect application. Useful application methods include for example roller coating, spin coating, spray coating, dip coating and air knife coating.

Useful plates include for example according to end use: transparent glasses such as white or blue glass plate, silica-coated blue glass plate, synthetic resin plate or films based for example on polyester, polycarbonate, acrylic or vinyl chloride resin, also metal plates based on aluminum, copper, nickel or steel and also ceramic plates or semiconductor plates having photoelectric transfer elements applied.

Application is generally effective in such a way that the photosensitive layer obtained is 0.1 to 10 μm in thickness.

Application may be followed by thermal drying of the layer.

Irradiation is preferably effected by exposing the photosensitive layer to an active light beam preferably in the form of an image pattern by means of a photomask. This cures the layer in the irradiated areas. Useful light sources include for example high pressure and ultra high pressure mercury vapour lamp, xenon lamp, metal halide lamp, fluorescent lamp and also laser beam in the visible region.

Development following exposure removes the unexposed part of the coating and the desired image pattern form of the colour elements is obtained. Customary methods of development comprise spraying with or dipping in aqueous alkaline developer or in an organic solvent containing inorganic alkali such for example sodium hydroxide or potassium hydroxide, sodium metasilicate or organic bases such as monoethanolamine, diethanolamine, triethanolamine, triethylamine or salts thereof.

Development is generally followed by thermal afterdrying/-curing of the image patterns.

Further Pigments:

The use of "pigments" in the above sense is preferably characterized in that these are used alone or in mixture with "other pigments" in the colour filters or pigment formulations or preparations for colour filters.

By "other pigments" are meant not only other metal salts of an azo compound of the formula (I) or solid pigment formulations based thereon but also other organic pigments.

With regard to the choice of other pigments optionally to be used, there is no restriction according to the invention. Both inorganic and organic pigments may be used.

Preferred organic pigments are for example those of the monoazo, disazo, laked azo, β-naphthol, Naphthol AS, benzimidazolone, disazo condensation, azo metal complex, isoindoline and isoindolinone series, also polycyclic pigments such as for example from the phthalocyanine, quinacridone, perylene, perinone, thioindigo, anthraquinone, dioxazine, quinophthalone and diketopyrrolopyrrole series. Also laked dyes such as Ca, Mg and Al lakes of sulpho- or carboxyl-containing dyes.

Examples of other organic pigments optionally to be used are yellow pigments of colour index
Colour Index Pigment Yellow 12, 13, 14, 17, 20, 24, 74, 83, 86, 93, 94, 109, 110, 117, 125, 137, 138, 139, 147, 148, 150, 153, 154, 166, 173, 185, or
Colour Index Pigment Orange 13, 31, 36, 38, 40, 42, 43, 51, 55, 59, 61, 64, 65, 71, 72, 73 or
Colour Index Pigment Red 9, 97, 122, 123, 144, 149, 166, 168, 177, 180, 192, 215, 216, 224, 254, 272, or
Colour Index Pigment Green 7, 10, 36, 37, 45, or
Colour Index Pigment Blue 15, 15:1, 15:2, 15:3, 15:4, 15:6, 16 and
Colour Index Pigment Violet 19, 23.

When "other pigments" are additionally used, the fraction of "pigment" in the above sense, is preferably 1-99% by weight, especially 20-80% by weight, based on the total amount of all pigments used.

Particular preference is given to the present invention's pigment formulations and also formulations comprising "pigments" in the above sense and C.I. Pigment Green 36 in a ratio of 20-80% of pigment to 80-20% of C.I. Pigment Green 36 and preferably of 40-60% to 60-40%.

With regard to binder resins which may be used together with the "pigment" or pigment formulations based thereon in colour filters or in the formulations to produce colour filters, for example by the pigment dispersion method, there is no particular restriction according to the invention; in particular, film-forming resins known per se are useful for application in colour filters.

Useful are for example binder resins from the group of the cellulose resins such as carboxymethylhydroxyethylcellulose and hydroxyethylcellulose, acrylic resins, alkyd resins, melamine resins, epoxy resins, polyvinyl alcohols, polyvinylpyrrolidones, polyamides, polyamide-imines, polyimides, polyimide precursors such as those of the formula (14) disclosed in JP-A 11 217 514 and esterification products thereof.

Examples thereof are reaction products of tetracarboxylic dianhydride with diamines.

Useful binder resins also include binder resins containing photopolymerizable, unsaturated bonds. Binder resins can be for example binder resins from the group of the acrylic resins. Useful are in particular homo- and copolymers of polymerizable monomers such as, for example, methyl (meth)acrylate, ethyl(meth)acrylate, propyl(meth)acrylate, butyl(meth)acrylate, styrene and styrene derivatives, also copolymers between carboxyl-bearing polymerizable monomers such as (meth)acrylic acid, itaconic acid, maleic acid, maleic anhydride, monoalkyl maleates, especially with alkyl of 1 to 12 carbon atoms, and polymerizable monomers such as (meth)acrylic acid, styrene and styrene derivatives, for example α-methylstyrene, m- or p-methoxystyrene, p-hydroxystyrene. Examples are reaction products of carboxyl-containing polymeric compounds with compounds which each contain an oxirane ring and an ethylenically unsaturated compound, for example glycidyl(meth)acrylate, acryloyl glycidyl ether and itaconic acid monoalkylglycidyl ether, etc., also reaction products of carboxyl-containing polymeric compounds with compounds which each contain a hydroxyl group and an ethylenically unsaturated compound (unsaturated alcohols) such as allyl alcohol, 2-buten-4-ol, oleyl alcohol, 2-hydroxyethyl(meth)acrylate, N-methylolacrylamide, etc.; such binder resins may also contain unsaturated compounds that have free isocyanate groups.

Generally the equivalence of the unsaturatedness (molecular weight of binder resin per unsaturated compound) of the binder resins mentioned is in the range from 200 to 3000, especially from 230 to 1000, to provide not only adequate photopolymerizability but also film hardness. The acid value is generally in the range from 20 to 300, especially in the range from 40 to 200, to provide sufficient alkali developability following exposure of the film.

The average molecular weight of the binder resins to be used is between 1500 and 200000, especially 10000 to 50000, g/mol.

The organic solvents used in the inventive use of the pigment formulations for colour filters are for example ketones, alkylene glycol ethers, alcohols and aromatic compounds. Examples from the group of ketones are acetone, methyl ethyl ketone, cyclohexanone, etc.; from the group of the alkylene glycol ethers; methylcellosolve (ethylene glycol monomethyl ester, butylcellosolve (ethylene glycol monobutyl ether), methylcellosolve acetate, ethylcellosolve acetate, butylcellosolve acetate, ethylene glycol monopropyl ether, ethylene glycol monohexyl ether, ethylene glycol dimethyl ether, diethylene glycol ethyl ether, diethylene glycol diethyl ether, propylene glycol monomethyl ether, propylene glycol monoethyl ether, propylene glycol monopropyl ether, propylene glycol monobutyl ether, propylene glycol monomethyl ether acetate, diethylene glycol methyl ether acetate, diethylene glycol ethyl ether acetate, diethylene glycol propyl ether acetate, diethylene glycol isopropyl ether acetate, diethylene glycol butyl ether acetate, diethylene glycol t-butyl ether acetate, triethylene glycol methyl ether acetate, triethylene glycol ethyl ether acetate, triethylene glycol propyl ether acetate, triethylene glycol isopropyl ether acetate, triethylene glycol butyl ether acetate, triethylene glycol t-butyl ether acetate, etc.;

from the group of the alcohols: methyl alcohol, ethyl alcohol, isopropyl alcohol, n-butyl alcohol, 3-methyl-3-methoxybutanol, etc.;

from the group of the aromatic solvents: benzene, toluene, xylene, N-methyl-2-pyrrolidone, ethyl N-hydroxymethyl-2 acetate, etc.

Further other solvents are 1,2-propanediol diacetate, 3-methyl-3-methoxybutyl acetate, ethyl acetate, tetrahydrofuran, etc. The solvents can be used individually or in mixtures with each other.

The invention further provides a photoresist containing at least one pigment in the above sense or at least one inventive pigment formulation and at least one photocurable monomer and also at least one photoinitiator.

The photocurable monomers contain at least one reactive double bond and optionally other reactive groups in the molecule.

Useful photocurable monomers in this context are in particular reactive solvents or reactive diluents, for example from the group of the mono-, di-, tri- and multifunctional acrylates and methacrylates, vinyl ethers and also glycidyl ethers. Additional reactive groups include allyl, hydroxyl, phosphate, urethane, sec. amine and N-alkoxymethyl groups.

Monomers of this type are known to one skilled in the art and are recited for example in [Römpp Lexikon, Lacke und Druckfarben, Dr. Ulrich Zoril, Thieme Verlag Stuttgart-New York, 1998, p. 491/492]. The choice of monomers depends in particular on the type and intensity of the irradiation used, the reaction desired with the photoinitiator and the film properties. It is also possible to use combinations of monomers.

Useful photoinitiators are compounds which, as a consequence of the adsorption of visible or ultraviolet radiation, form reactive intermediates capable of inducing a polymerization reaction for example of the abovementioned monomers and/or binder resins. Photoinitiators are likewise generally known and can likewise be taken from [Römpp Lexikon, Lacke und Druckfarben, Dr. Ulrich Zorll, Thieme Verlag Stuttgart-New York, 1998, p. 445/446].

According to the invention, there is no restriction with regard to the photocurable monomers or photoinitiators to be used.

The invention preferably provides photoresists comprising

A) at least one "pigment" in the above sense, especially in mixture with other pigments, preferably C.I. Pigment Green 36 or a pigment formulation which is in accordance with the present invention and based thereon,
B1) at least one photocurable monomer,
B2) at least one photoinitiator,
C1) if appropriate an organic solvent,
D) if appropriate a dispersant,
E) if appropriate a binder resin, and also if appropriate further additives.

According to the invention, there is no restriction either with regard to the technology for generating the coloured image element patterns on the basis of the pigments or solid pigment formulations to be used according to the invention. As well as the above-described photolithographic process, other processes such as offset printing, chemical milling or inkjet printing are also suitable. The choice of suitable binder resins and solvents or pigment transfer media and also other additives must be conformed to the particular process. The inkjet process, which includes not only thermal but also mechanical and piezomechanical inkjet printing, utilizes not only purely organic but also aqueous organic vehicle media for the pigments and optionally binder resins; aqueous organic vehicle media are in fact preferred.

EXAMPLES

Example 1

Without Doping 1 mol of diazobarbituric acid is reacted with 1 mol of barbituric acid in 5 litres of hot water at 90° C. at pH 5 by KOH titration. 2 mol of melamine are added. The pH is adjusted to 5 with hydrochloric acid. 1 mol of 40% nickel chloride solution is added dropwise. After 1 h at 90° C. the batch is adjusted to pH 5 with KOH. This is followed by adjustment to pH 1.5 with hydrochloric acid and heat treating at 98° C. for 3 h. This is followed by adjustment to pH 5 with KOH. The pigment is subsequently isolated on a suction filter, washed, dried at 80° C. in a vacuum drying cabinet and ground for about 2 minutes in a customary laboratory mill.

The nickel chloride solution is replaced by a mixed solution of nickel chloride and copper chloride in the following inventive examples:

Example 1a 1 mol of Ni replaced by 0.998 mol of Ni+0.002 mol of Cu

Example 1b 1 mol of Ni replaced by 0.995 mol of Ni+0.005 mol of Cu

Example 1c 1 mol of Ni replaced by 0.99 mol of Ni+0.01 mol of Cu

Example 1d 1 mol of Ni replaced by 0.98 mol of Ni+0.02 mol of Cu

Example 1e 1 mol of Ni replaced by 0.96 mol of Ni+0.04 mol of Cu

Example 1f 1 mol of Ni replaced by 0.92 mol of Ni+0.08 mol of Cu

Example 1g 1 mol of Ni replaced by 0.84 mol of Ni+0.16 mol of Cu 4 g of each in-test pigment were bead milled with 396 g of a commercial white paste, for example Ready Nova 70 from Nordsjö (Akzo Nobel), and 400 ml of glass beads 2 mm in diameter in a Süβmeier bead mill for 30 min with cooling. The pastes were applied to drawdown paper using a wire-wound blade (25 µm) and colorimetrically measured using the Color Guide 450 colour meter from Gardner.

A binder system is suitable for determining the colour properties. The results are very readily transferable to LCD application colour properties with regard to hue and brilliance.

The principle of colour measurement is described for example in Bayer Farben Revue, Sonderheft 3/2 D, Farbmessung 1986.

The null tests have 100% colour strength by definition. DC and DH of the null tests are by definition 0.

| Example | BET* | Binder colour strength | Binder DC | Binder DH |
|---|---|---|---|---|
| 1 | 110 | 100% | 0 | 0 |
| 1a | 107 | 101% | 0.8 | 0 |
| 1b | 106 | 100% | 1.2 | 0 |
| 1c | 106 | 101% | 1.9 | −0.1 |
| 1d | 106 | 100% | 2.3 | −0.1 |
| 1e | 107 | 100% | 1.6 | −0.2 |
| 1f | 113 | 101% | 0.5 | −0.9 |
| 1g | 114 | 101% | −0.7 | −1.4 |

*reported in m$^2$/g, determined according to German standard specification DIN 66131.

DC is a measure of brilliance and is determined colorimetrically. A positive value is desired and represents a higher brilliance than the comparative value.

DH is a mesure of colour shift and is determined colorimetrically. A value less than zero indicates the desired red shift of the yellow component.

Example 1 was repeated except that the nickel chloride solution was replaced by a mixed solution of nickel chloride and cerium chloride.

Example 2a 1 mol of Ni replaced by 0.998 mol of Ni+0.002 mol Ce

Example 2b 1 mol of Ni replaced by 0.995 mol of Ni+0.005 mol Ce

Example 2c 1 mol of Ni replaced by 0.99 mol of Ni+0.01 mol Ce

Example 2d 1 mol of Ni replaced by 0.98 mol of Ni+0.02 mol Ce

Example 2e 1 mol of Ni replaced by 0.96 mol of Ni+0.04 mol Ce

Example 2f 1 mol of Ni replaced by 0.92 mol of Ni+0.08 mol Ce

Example 2g 1 mol of Ni replaced by 0.84 mol of Ni+0.16 mol Ce

| Example | BET* | Binder colour strength | Binder DC | Binder DH |
|---|---|---|---|---|
| 2 | 110 | 100% | 0 | 0 |
| 2a | 108 | 101% | 0.0 | −0.1 |
| 2b | 110 | 101% | 0.1 | −0.2 |
| 2c | 109 | 101% | 0.2 | −0.2 |
| 2d | 110 | 101% | 0.5 | −0.3 |
| 2e | 108 | 101% | 0.9 | −0.5 |
| 2f | 105 | 102% | 1.2 | −0.5 |
| 2g | 101 | 101% | −1.4 | −1.5 |

*see Table 1

Example 1 was repeated except that the nickel chloride solution was replaced by a mixed solution of nickel chloride and cobalt chloride.

Example 3a 1 mol of Ni replaced by 0.998 mol of Ni+0.002 mol Co

Example 3b 1 mol of Ni replaced by 0.995 mol of Ni+0.005 mol Co

Example 3c 1 mol of Ni replaced by 0.99 mol of Ni+0.01 mol Co

Example 3d 1 mol of Ni replaced by 0.98 mol of Ni+0.02 mol Co

Example 3e 1 mol of Ni replaced by 0.96 mol of Ni+0.04 mol Co

Example 3f 1 mol of Ni replaced by 0.92 mol of Ni+0.08 mol Co

| Example | BET | Binder colour strength | Binder DC | Binder DH |
|---|---|---|---|---|
| 3 | 110 | 100% | 0 | 0 |
| 3a | 107 | 101% | 0.3 | 0.1 |
| 3b | 108 | 100% | 0.5 | 0.0 |
| 3c | 110 | 101% | 0.7 | 0.1 |
| 3d | 109 | 101% | 0.9 | 0.1 |
| 3e | 110 | 101% | 0.2 | −0.1 |
| 3f | 111 | 103% | −0.1 | −0.3 |

Example 4

1 mol of diazobarbituric acid is reacted with 1 mol of barbituric acid in 5 litres of hot water at 90° C. at pH 5 by KOH titration. The pH is adjusted to 5 with hydrochloric acid. 1 mol of 40% nickel chloride solution is added dropwise. 2 mol of melamine are added within 1 hour. After 1 h at 90° C. the batch is adjusted to pH 5 with KOH. This is followed by adjustment to pH 1.5 with hydrochloric acid and heat treating at 98° C. for 3 h. This is followed by adjustment to pH 5 with KOH. The pigment is subsequently isolated on a suction filter, washed, dried at 80° C. in a vacuum drying cabinet and ground for about 2 minutes in a customary laboratory mill.

The equimolar nickel chloride solution (1 mol) was replaced by nickel chloride solution in deficiency (0.997 or 0.99 and 0.98 mol respectively) in the examples which follow. The bases used are KOH and NaOH.

Example 4a

KOH, 0.997 mol of Ni

Example 4b

KOH, 0.99 mol of Ni

Example 4c

KOH, 0.98 mol of Ni

Example 4d

NaOH, 0.98 mol of Ni

The pigment powders thus obtained were incorporated into an aqueous binder formulation.

| Example | BET | Binder colour strength | Binder DC | Binder DH |
|---|---|---|---|---|
| 4 | 102 | 100% | 0 | 0 |
| 4a | 102 | 100% | 0.1 | −0.3 |
| 4b | 101 | 101% | 0.7 | −0.4 |
| 4c | 99 | 100% | 0.2 | −0.6 |
| 4d | 102 | 100% | 0.7 | 0.1 |

Example 5

1 mol of diazobarbituric acid is reacted with 1 mol of barbituric acid in 5 litres of hot water at 90° C. at pH 5 by KOH titration. The pH is adjusted to 5 with hydrochloric acid. 1 mol of 20% cobalt chloride solution is added dropwise. 2 mol of melamine are added within 1 hour. After 1 h at 90° C. the batch is adjusted to pH 5 with KOH. The pigment is subsequently isolated on a suction filter, washed, dried at 80° C. in a vacuum drying cabinet and ground for about 2 minutes in a customary laboratory mill.

The equimolar cobalt chloride solution (1 mol) was replaced by cobalt chloride solution in deficiency (0.99 and 0.98 mol respectively) in the examples which follow. The bases used are KOH and NaOH.

Example 5a

KOH, 0.99 mol Co

Example 5b

KOH, 0.98 mol Co

Example 5c

NAOH, 0.98 mol Co

The pigment powders thus obtained were incorporated into an aqueous binder formulation.

The null tests have 100% colour strength by definition. DC and DH are by definition 0.

| Example | BET | Binder colour strength | Binder DC | Binder DH |
|---------|-----|------------------------|-----------|-----------|
| 5       | 37  | 100%                   | 0         | 0         |
| 5a      | 35  | 101%                   | 0.6       | −0.1      |
| 5b      | 42  | 101%                   | 2.0       | 0.5       |
| 5c      | 44  | 99%                    | 3.5       | 0.5       |

The pigment mixtures obtained in the aforementioned examples can be used as described in the use examples of EP-A 1 146 087 to produce a photoresist and for application in the LCD sector.

Example 6

1 mol of diazobarbituric acid is reacted with 1 mol of barbituric acid in 5 litres of hot water at 90° C. at pH 5 by KOH titration. 2 mol of melamine are added. The pH is adjusted to 5 with hydrochloric acid. 1 mol of 40% nickel chloride solution is added dropwise. After 1 h at 90° C. the batch is adjusted to pH 5 with KOH. This is followed by adjustment to pH 1.5 with hydrochloric acid and heat treating at 98° C. for 3 h. This is followed by adjustment to pH 5 with KOH. The pigment is subsequently isolated on a suction filter, washed, dried at 80° C. in a vacuum drying cabinet and ground for about 2 minutes in a customary laboratory mill.

The nickel chloride solution is replaced by a mixed solution of nickel chloride and copper chloride in the following inventive examples:

Example 6a 1 mol of Ni replaced by 0.99 mol of Ni+0.01 mol of Cu

Example 6b 1 mol of Ni replaced by 0.96 mol of Ni+0.04 mol of Cu

Example 6c 1 mol of Ni replaced by 0.92 mol of Ni+0.08 mol of Cu 2 g of each in-test pigment and 2 g of P.G. 36 were bead milled with 396 g of a commercial white paste, for example Ready Nova 70 from Nordsjö (Akzo Nobel), and 400 ml of glass beads 2 mm in diameter in a Süßmeier bead mill for 30 min with cooling. The pastes were applied to drawdown paper using a wire-wound blade (25 μm) and calorimetrically measured using the Color Guide 450 colour meter from Gardner.

The null tests have 100% colour strength by definition. DC and DH of the null tests are by definition 0.

| Example | Binder colour strength | Binder DC | Binder DH |
|---------|------------------------|-----------|-----------|
| 6       | 100%                   | 0         | 0         |
| 6a      | 100%                   | 1.5       | −0.2      |
| 6b      | 101%                   | 1.5       | −0.4      |
| 6c      | 100%                   | 0.4       | −0.6      |

What is claimed is:

1. A pigment formulation comprising:
a) at least one metal complex of an azo compound which in the form of its tautomeric structures conforms to the formula (I)

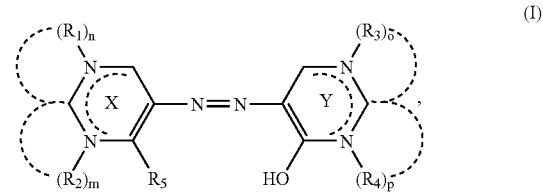

where the

X and Y rings independently bear one or two substituents selected from the group consisting of =O, =S, =$NR_7$, —$NR_6H_7$, —$OR_6$, —$SR_6$, —$COOR_6$, —CN, —$CONR_6R_7$, —$SO_2R_8$,

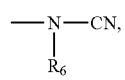

alkyl, cycloalkyl, aryl and aralkyl wherein each of the X and Y rings have a sum total of three endo- and exocyclic double bonds, $R_6$ represents hydrogen, alkyl, cycloalkyl, aryl or aralkyl, $R_7$ represents hydrogen, cyano, alkyl, cycloalkyl, aryl, aralkyl or acyl, $R_8$ represents alkyl, cycloalkyl, aryl or aralkyl, $R_1$, $R_2$, $R_3$, $R_4$ independently represent hydrogen, alkyl, cycloalkyl, aryl or aralkyl and, as indicated by the broken lines in the formula (I), may combine to form 5- or 6-membered rings to which further rings may be fused, $R_5$ represents —OH, —$NR_6R_7$, alkyl, cycloalkyl, aryl or aralkyl, wherein the $R_1$ to $R_8$ substituents, optionally, contain substituted CH bonds and m, n, o, p denote 1 or zero when double bonds emanate from the ring-nitrogen atoms,
and which metal complexes intercalate with at least one other compound,
b) an iron compound other than component a) having an iron content of less than 30 ppm, based on component a), and
c) at least one metal compound having a metal that is in each case different than that of the metal of components a) and b) and having a metal content of at least 10 ppm, based on component a), the metal being selected from the group consisting of alkali metals Li, Na and K, alkaline earth metals Mg, Ca and Ba, lanthanoids La, Ce, Pr and Nd and also Al, Sc, Ti, V, Cr, Mn, Co, Cu, Ni and Zn.

2. The pigment formulation according to claim 1, wherein the metal of component c) is in an amount of 10 to 10,000 ppm, based on component a).

3. The pigment formulation according to claim 1 wherein the metal of component c) is present as a metal complex of an azo compound of the formula (I).

4. The pigment formulation according to claim 1 wherein the X ring in the compound of the formula (I) represents

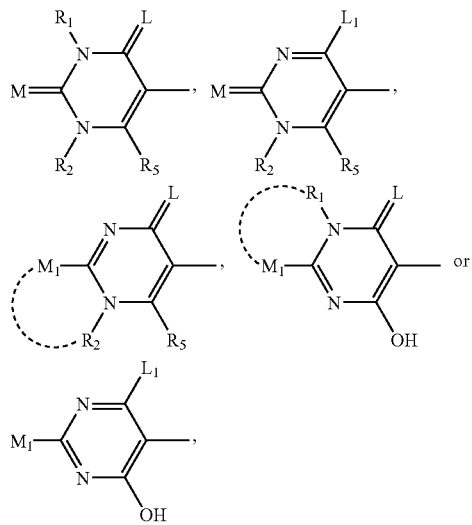

in each of which
L and M independently represent =O, =S or =NR$_6$
L$_1$ represents hydrogen, —OR$_6$, —Sr$_6$, —NR$_6$R$_7$, —COOR$_6$, —CONR$_6$R$_7$, —CN, alkyl, cycloalkyl, aryl or aralkyl and
M$_1$ represents —OR$_6$, —SR$_6$, —NR$_6$R$_7$, —COOR$_6$, —CONR$_6$R$_7$, —CN, —SO$_2$R$_8$,

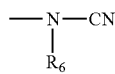

alkyl, cycloalkyl, aryl or aralkyl, and
wherein the substituents M$_1$ and R$_1$ or M$_1$ and R$_2$ may combine to form a 5- or 6-membered ring.

5. The pigment formulation according to claim 1 wherein the azo compound of the formula (I) is in the form of its free acid of formula (II) or (III) or to one of its tautomeric formulae

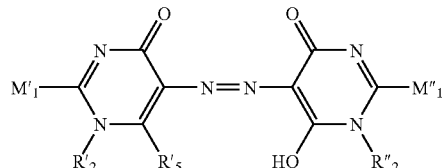

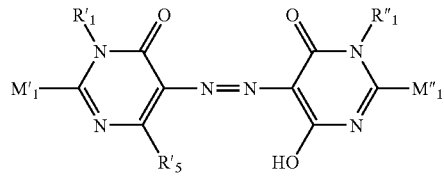

in each of which
represents —OH or —NH$_2$,
R'$_1$, R"$_1$, R'$_2$ and R"$_2$ each represent hydrogen and
M'$_1$ and M"$_1$ independently represent hydrogen, —OH, —NH$_2$, —NHCN, arylamino or acylamino.

6. The pigment formulation according to claim 1 wherein the azo compound of the formula (I) conforms to formula (V) or to a tautomeric form thereof

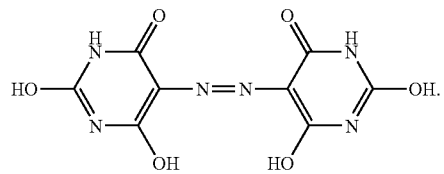

7. The pigment formulation according to claim 1 wherein the metal complexes of component a) correspond to mono-, di-, tri- and tetraanions of the azo compounds of the formula (I) with metals selected from the group consisting of Li, Na, K, Mg, Ca, Ba, Al, Sc, Ti, V, Cr, Mn, Go, Ni, Cu, Zn, La, Ce, Pr, and Nd.

8. The pigment formulationl according to claim 1 wherein the metal of the metal complex of component a) is Ni.

9. The pigment formulation according to claim 1 wherein the metal complex of component a) intercalates with a cyclic or acyclically organic compound.

10. The pigment formulation according to claim 1 wherein the metal of the metal compound of component c) is at least one metal selected from the group consisting of Li, Na, K, Ca, Ba, Al, Mn, Go, Ni, Cu, Zn, La, and Ce.

11. The pigment formulation according to claim 1 further comprising at least one dispersant.

12. The pigment formulation according to claim 1, further comprising C.I. Pigment Green 36.

13. The pigment formulation according to claim 1, further comprising a component d) comprising at least one organic compound selected from the group consisting of terpenes, terpenoids, fatty acid esters, homo- or copolymers, and random or block copolymers having a solubility of less than 1 g/l in water at 20° C.

14. The pigment of claim 1, wherein the iron compound of component b) has an iron content of less than 20 ppm.

15. The pigment of claim 1, wherein the iron compound of component b) has an iron content of less than 10 ppm.

16. The pigment of claim 1, wherein the iron compound of component b) has an iron content of from 1 to 5 ppm.

17. The pigment of claim 1, wherein the metal of component c) is in an amount of 50 to 5000 ppm based on component a).

18. The pigment of claim 1, wherein the metal of component c) is in an amount of 200 to 2500 ppm based on component a).

19. The pigment of claim 1, wherein the metal of component c) is in an amount of 200 to 1000 ppm based on component a).

20. The pigment of claim 1, wherein the metal complexes of component a) correspond to mono-, di-, tri-, and tetraanions of azo compounds of formula (I) with metals selected from the group consisting of Na, K, Ca, Ba, Al, Mn, Co, Ni, Cu, Zn, La, and Ce.

21. The pigment of claim 1, wherein the metal compound of component c) is at least one metal selected from the group consisting Co and Cu.

22. The pigment of claim 1, wherein the metal complex of component a) intercalates with melamine.

23. The pigment of claim 13, comprising a component d) having a solubility of less than 0.1 g/l in water at 20° C.

24. The pigment of claim 1, wherein the metal compound of component c) is at least one metal selected from the group consisting of Na, K, Co, and Cu.

25. A process for producing pigment formulation according to claim 1 wherein the azo compound of the formula (I) is complexed with a metal salt a) in the presence of an iron salt b) having an iron content of less than 30 ppm, based on component a) and in the presence of a metal salt c) which is other than a) and b) and whose metal content is at least 10 ppm based on component a) and a compound to be intercalated is added before, during or after the complexing.

26. A process for producing formulation according to claim 25 wherein a metal complex of an azo compound of the formula (I), said metal complex intercalating a further compound (component a)) is mixed with an Fe compound (component b)) whose Fe content is less than 30 ppm, based on component a), and with at least one metal compound whose metal content is less than 10 ppm, based on component a), and whose metal is other than the metal of the metal complex of components a) and b)).

27. A process for producing pigmented articles comprising ink jet inks, color filters for liquid crystal displays, printing inks which are not ink jettable, distemper color or binder colors, for the mass coloration of synthetic, semisynthetic or natural macromoleoule materials comprising incorporating the pigment formulation according to claim 1 into the pigmented articles.

28. A process for producing color filters for liquid crystal displays comprising incorporating the pigment formulation of claim 1 in a color filter for liquid crystal displays.

29. A process for producing color lifters for liquid crystal displays, wherein at least one pigment formulation according to claim 1 is ground in an organic solvent in the presence of a binder resin and/or dispersant and subsequently processed in the presence of photocurable monomers, photoreaction initiator and optionally a further binder and/or solvent to form a photoresist which is thereafter applied by a coating method selected from the group consisting of roller, spray, spin, dip and air knife coating, onto a substrate irradiated using a photomask and then cured and developed to form a ready-produced colored filter.

30. A method of coloring inks and/or dyes in printing inks producing color filters by photolithography, offset printing or mechanical, piezomechanical or thermal ink jet printing comprising incorporating the pigment formulation of claim 1 into the inks and/or dyes.

31. The method according to claim 30, wherein the printing inks further comprise an aqueous organic vehicle medium.

32. A color filter comprising at least one pigment formulation according to claim 1.

33. A liquid crystal display comprising at least one color filter according to claim 32.

34. A photoresist comprising at least one photocurable monomer, at least one photoinitiator and at least pigment formulation according to claim 1.

35. A pigment comprising:
a) at least one metal complex of an azo compound which in the form of its tautomeric structures conforms to the formula (V)

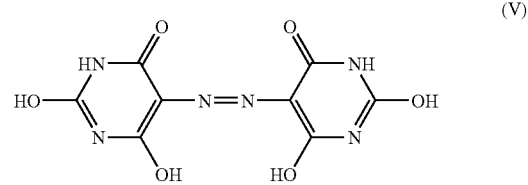

wherein the metal of the metal complex is Ni,
b) an iron compound having an iron content of less than 30 ppm based on component a), and
c) at least one metal compound having a metal that is in each case different than that of the metal of components a) and b) and having a metal content of at least 10 ppm, based on component a), the metal being selected from the group consisting of alkali metals, Li, Na and K, alkaline earth metals, Mg, Ca and Ba, lanthanoids, La, Ce, Pr and Nd and Al, Sc, Ti, V, Cr, Mn, Cc, Cu, and Zn.

36. The pigment of claim 35, wherein the metal complex of component a) intercalates with a cyclic or acyclically organic compound.

37. The pigment of claim 35, wherein the metal complex of component a) intercalates with melamine.

* * * * *